US005746600A

United States Patent [19]

Chang

[11] Patent Number: 5,746,600

[45] Date of Patent: May 5, 1998

[54] COLOR REFERENCE CHIPS SYSTEM FOR PLASTICS

[76] Inventor: Chin-lu Chang, No.17, Chung Liao, Chung Liao Tsun, Lu Tsao Hsiang, Chiayi Hsien, Taiwan

[21] Appl. No.: 805,469

[22] Filed: Feb. 25, 1997

[30] Foreign Application Priority Data

Sep. 20, 1996 [TW] Taiwan ................................ 85214554

[51] Int. Cl.$^6$ .................................................... G09B 19/00

[52] U.S. Cl. ............................................. 434/98; 434/367

[58] Field of Search ............................ 434/98, 102, 367, 434/100, 76, 365; 356/402, 403, 404, 408, 421

[56] References Cited

U.S. PATENT DOCUMENTS 1,608,685 11/1926 Vesser .................................... 356/402

1,612,791 1/1927 Ames et al. ......................... 434/98 X

FOREIGN PATENT DOCUMENTS 556196 4/1958 Canada ................................. 434/365

0339303 11/1989 European Pat. Off. ............... 356/421

350363 6/1931 United Kingdom .................. 434/365

*Primary Examiner*—Jeffrey A. Smith

*Attorney, Agent, or Firm*—Kolisch Hartwell Dickinson McCormack & Heuser

[57] ABSTRACT

A color reference chips system for plastics has a sheet having a plurality of sets of holes, each set being provided with two holes, a first side of each hole receiving a color chip made of dyed plastic film whereby shade difference between the color chips is perceptible when light is shone from a second side of said hole. A plurality of chips can be bound together and enclosed by a portfolio.

5 Claims, 5 Drawing Sheets

COLOR REFERENCE CHIPS SYSTEM FOR PLASTICS

BACKGROUND OF THE INVENTION

The present invention relates to a color reference chips system, particularly a color reference chips system for plastics industry.

Although plastic material is not environmental friendly, it is still impossible for people to stopping using them. On the contrary, the tendency for using plastic material is largely increasing. Since plastic material is closely related to the daily life of people and dyeing of plastic products is an essential requirement in relevant industries, producers have to create additional values such as attractive appearance so as to increase the competition of the products. However, no color reference chips system is available in the plastic industry so that the following shortcomings will happen:

1. operators have to spend a lot of time in testing colors;
2. misunderstanding regarding colors between the operators and designers will happen;
3. the conventional process is time-consuming; and
4. producers have to keep a large stock of plastic material and pigment.

Dyeing methods, generally includes pigment dyeing, pellet dyeing, and masterbatch dyeing. Although the pigment dyeing is economical, it is still unsuitable to be applied to an automatic process due to heavy air pollution and unstable quality. However, the pigment dyeing is not as economic in cost as expected if the cost for cleaning of blending devices is included. The pellet dyeing is advantageous with respect to avoiding cleaning blending devices and achieving stable quality, however, more space is needed to keep a large amount of stock material.

The lack of a standard color reference chips system for the plastics industry is due to the diversity of plastic materials and properties of the plastic materials. Therefore, it is impossible to select a single material as a general representative. Although most of the producers in the plastics industry use the PANTONE™ color reference system which is generally used in the ink and paint industries as a preferred choice, the above-mentioned shortcomings still exist.

In view of the drawbacks of the lack of a standard color reference chips system for manufacturing plastic products, the present invention solves the problems heretofore commonly in existence.

It is the purpose of this present invention, therefore, to mitigate and/or obviate the above-mentioned drawback in the manner set forth in the detailed description of the preferred embodiment.

SUMMARY OF THE INVENTION

Plastic materials are generally classified with respect to their properties, texture, and colors, into a plurality groups and each representative material is selected to blend with a masterbatch and then a single color is produced. A masterbatch is an admixture of a specific pigment and a common resin which is miscible with each plastic materials.

It is an object of this invention to provide a color reference chips system for plastic material.

Another object of this invention is to provide a color reference chips system for plastics, in which each corresponding masterbatch of color is available.

Another object of this invention is to provide a color reference chips system for plastics, which will expedite the procedures in clarifying color, manufacturing pigment, and also avoid keeping a large amount of stock materials.

Further objects and advantages of the present invention will become apparent as the following description proceeds, and the features of novelty which characterize the invention will be pointed out with particularity in the claims annexed to and forming a part of this application.

DETAILED DESCRIPTION OF THE PREFERRED EMBODIMENTS

Figure 1:
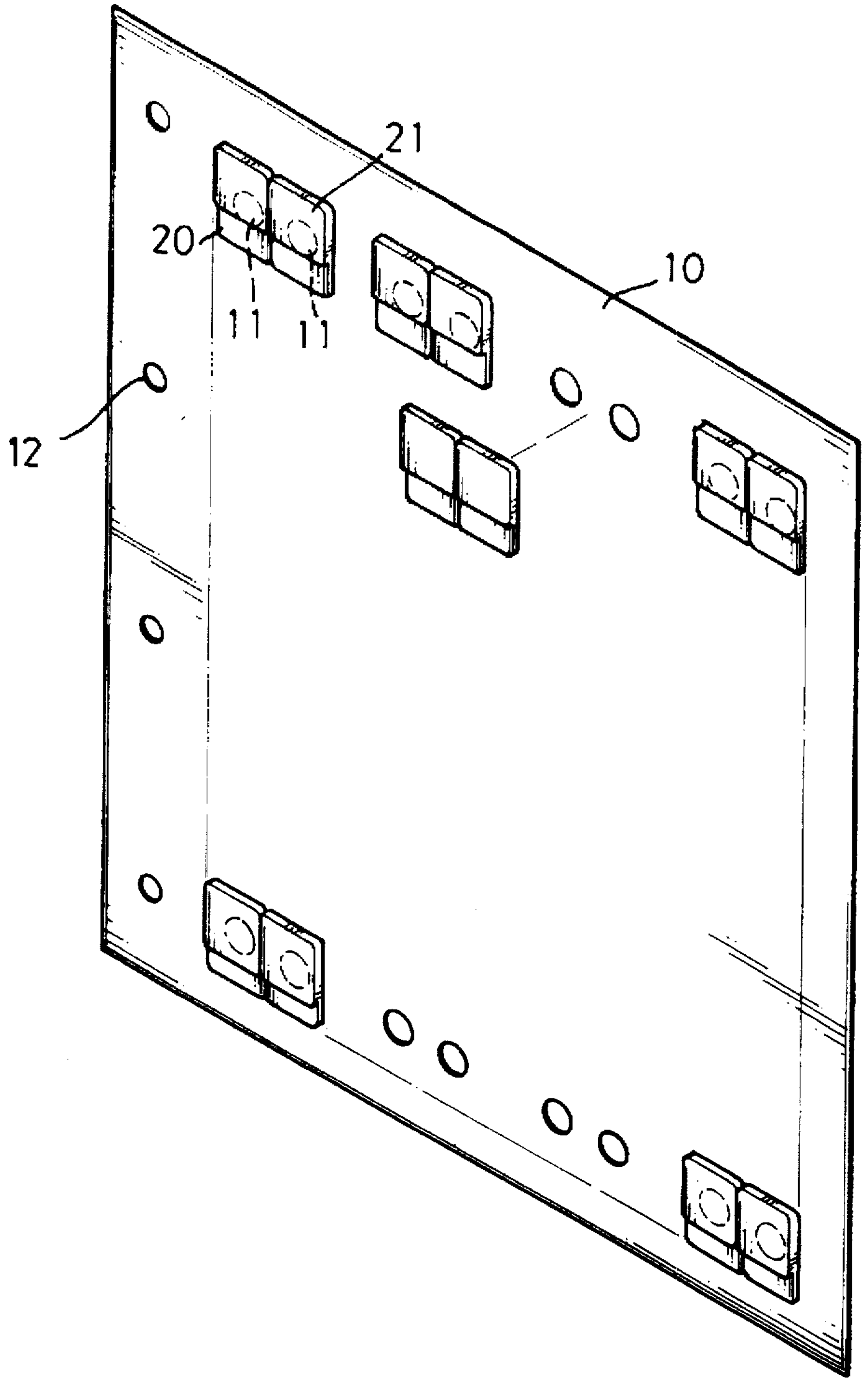
FIG. 1 is a perspective view of a sheet of color reference chip of the present invention.
Figure 3:
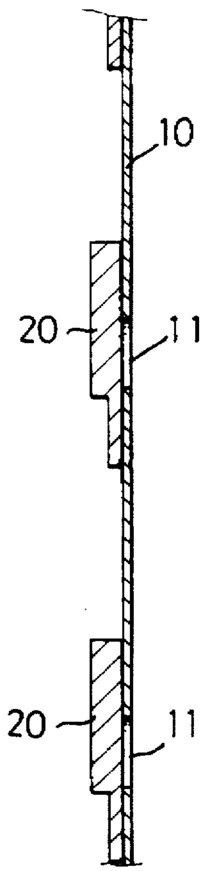
FIG. 3 is a side elevational view of the present invention.
Figure 2:
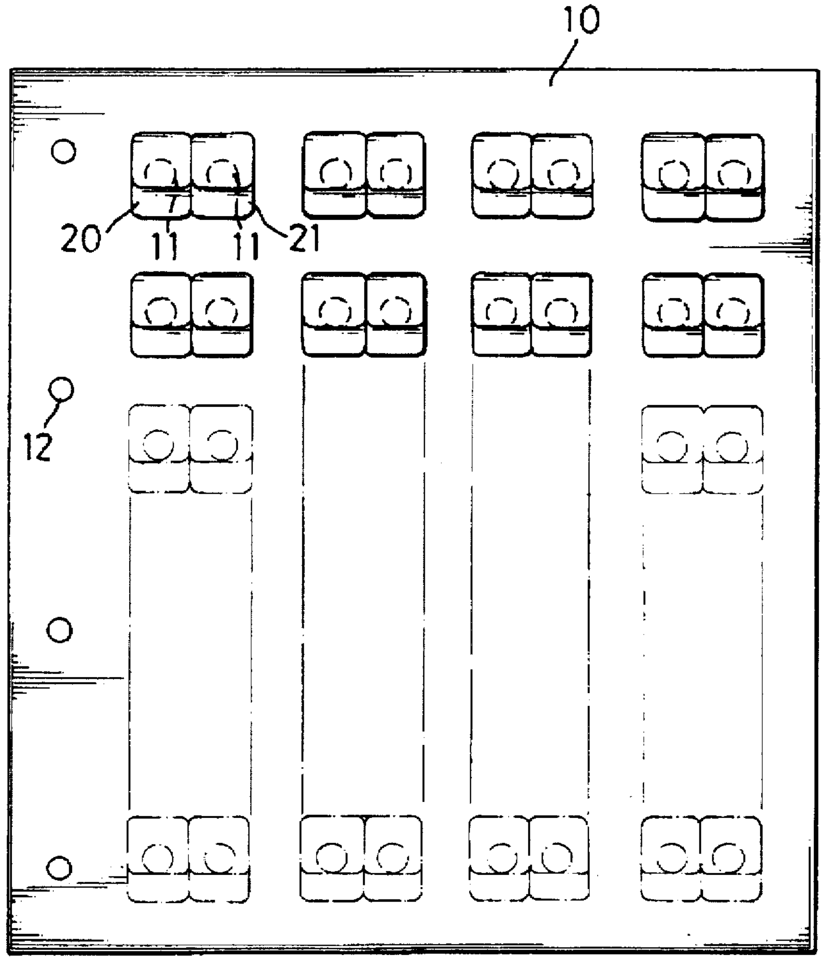
FIG. 2 is a front elevational view of the present invention.
Figure 4:
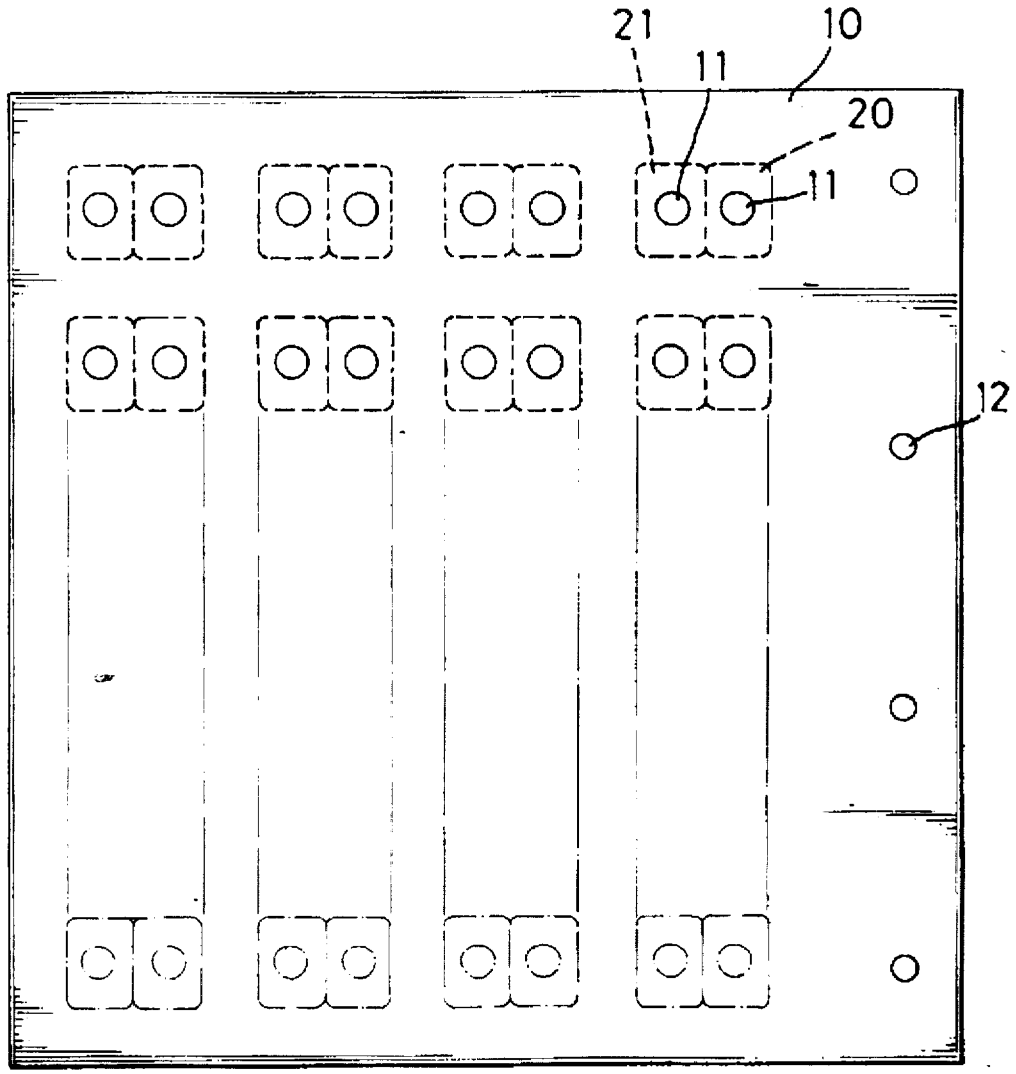
FIG. 4 is a rear elevational view of the present invention.
Figure 5:
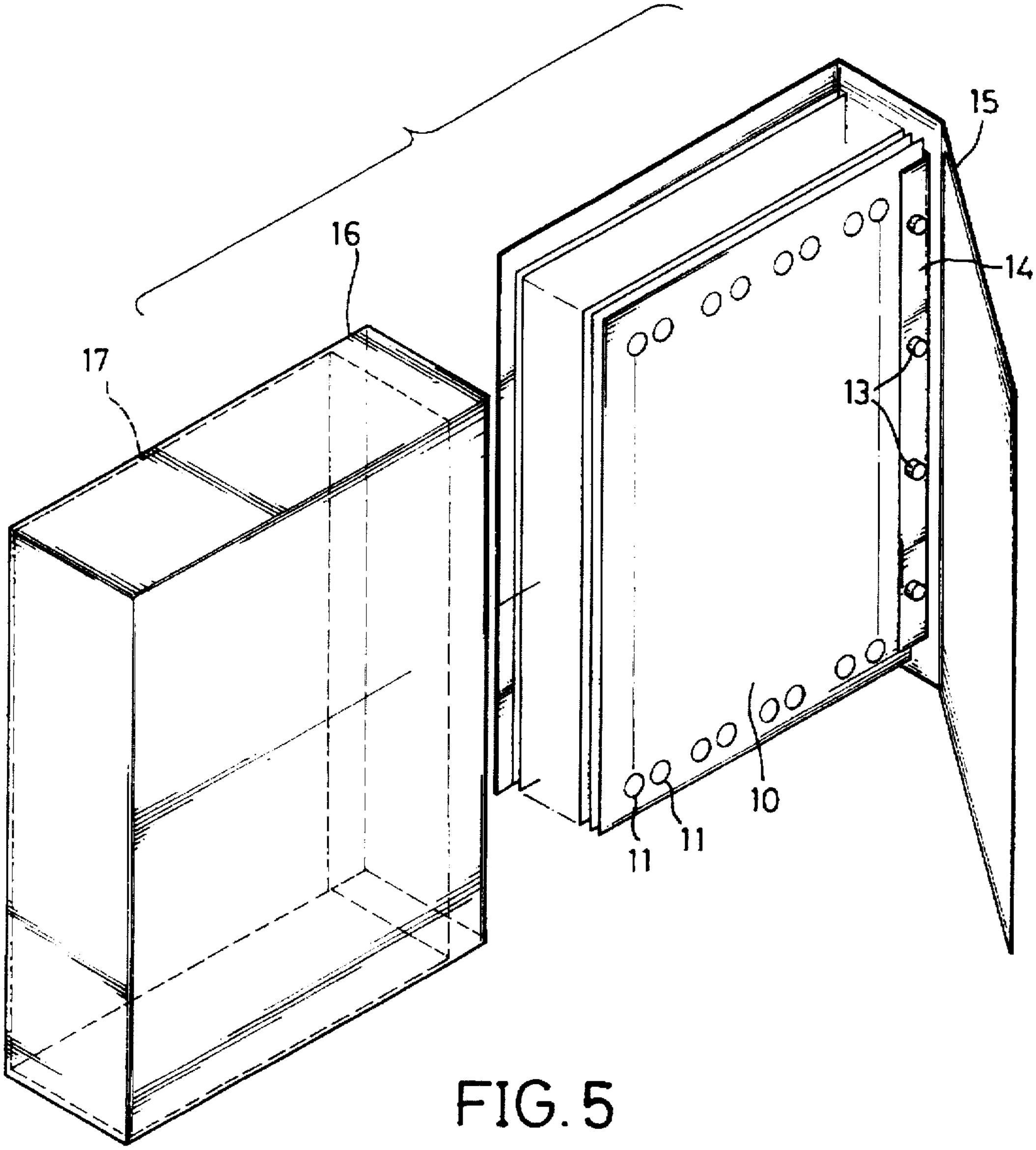
FIG. 5 is a perspective view of an assembly of color reference chips of the present invention, having an outer portfolio.
Figure 6:
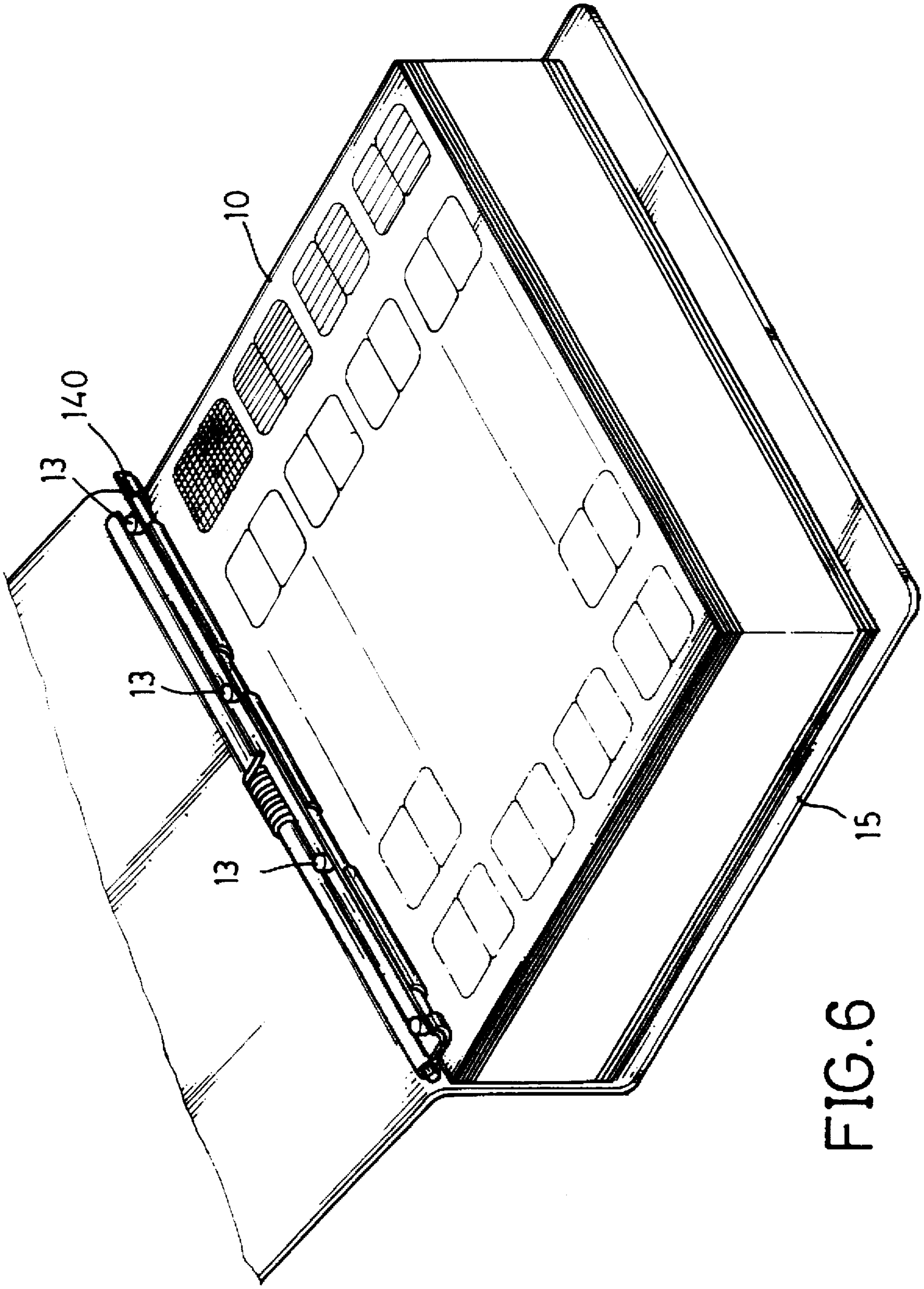
FIG. 6 is a perspective view of FIG. 5 in which the portfolio is open.

In reference to FIGS. 1 and 2, a sheet 10 is provided with a plurality of sets of holes 11, in which each hole 11 receives a color chip 20 or 21. It is to be noted that color chips 20, 21, have a slight difference in color for comparison. Each color chip 20, 21 is made of a plastic material which has been dyed. Each color chip 20, 21 is designated with a numeral. In reference to FIGS. 3 and 4, shade difference, i.e, transparency difference, between each color chip 20, 21 is perceptible when light is shone from a direction other the side of sheet 10 which receives the color chip 20, 21 because the weight percentage of pigments in the color chip 20 can be 4%, and in the color chip 21, it can be either 2% or 1.3%. In reference to FIGS. 5 and 6, each sheet 10 is provided with a plurality of binding holes 12 (see FIGS. 1 and 2) at one end thereof so that a plurality of the sheets 10 can be secured by a plurality of inserts 13 passing through each corresponding binding hole 12. Each insert 13 is secured by a securing means 140 and a plate 14 at the two outer most chips 20, 21 thereof. The sheets 10 secured by inserts 13 and the plate 14 are enclosed by a bendable portfolio 15. The portfolio 15 is placed into a casing 16, in which a film 17 protects the sheets 10 from light.

As long as clients select the desired color from the color reference chips system, producers can make samples and arrange the manufacturing schedule right away, saving the time which is essentially necessary in clarifying color so as to avoid incorrect manufacturing.

Accordingly, the present invention possesses the following advantages:

A color standard is established so that confusion with respect to colors can be avoided.

After clients selecting the desired color, producers can arrange the manufacture of a sample and product without worrying about the misunderstanding that might happen under conventional circumstance.

Color chips 20 and 21 are each designated with a numeral, from which each corresponding masterbatch for the selected color can be found right away so that the time spent in preparing a sample will decrease to a large extent from 1 to 2 weeks to 1 or 2 days.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as shall fall within the scope of the appended claims.

I claim:

1. A color reference chips system for plastics comprising a sheet having a plurality of sets of holes, each set being provided with two holes, a first side of each hole receiving a color chip made of dyed plastic whereby shade difference between said color chips is perceptible when light is shone from a second side of said hole.

2. A color reference chips system for plastics according to claim 1, wherein said sheet is provided with a plurality of holes for assembly.

3. A color reference chips system for plastics according to claim 1, wherein each color chip is provided with a numeral.

4. A color reference chips system for plastics according to claim 1, wherein said color chip made of dyed plastic is protected by a film.

5. A color reference chips system for plastics according to claim 1, wherein a plurality of said color chips are enclosed by a portfolio.

* * * * *